United States Patent
Smoot et al.

(10) Patent No.: US 8,269,447 B2
(45) Date of Patent: Sep. 18, 2012

(54) MAGNETIC SPHERICAL BALANCING ROBOT DRIVE

(75) Inventors: Lanny Smoot, Thousand Oaks, CA (US); Dirk Ruiken, Amherst, MA (US)

(73) Assignee: Disney Enterprises, Inc., Burbank, CA (US)

( * ) Notice: Subject to any disclaimer, the term of this patent is extended or adjusted under 35 U.S.C. 154(b) by 359 days.

(21) Appl. No.: 12/726,136

(22) Filed: Mar. 17, 2010

(65) Prior Publication Data

US 2011/0231013 A1 Sep. 22, 2011

(51) Int. Cl.
| | |
|---|---|
| *G06F 19/00* | (2006.01) |
| *B62D 61/00* | (2006.01) |
| *G05D 1/02* | (2006.01) |
| *A63J 19/00* | (2006.01) |

(52) U.S. Cl. ............ 318/489; 180/24.01; 180/24.03; 414/744.6; 700/245; 446/396

(58) Field of Classification Search ............ 318/580, 318/489; 414/744.6, 589, 444; 180/21, 24.01, 180/24.03; 700/245; 446/396

See application file for complete search history.

(56) References Cited

U.S. PATENT DOCUMENTS

| | | | | |
|---|---|---|---|---|
| 5,739,657 | A * | 4/1998 | Takayama et al. | 318/587 |
| 5,952,796 | A * | 9/1999 | Colgate et al. | 318/1 |
| 2004/0168837 | A1* | 9/2004 | Michaud et al. | 180/9.46 |
| 2009/0177323 | A1* | 7/2009 | Ziegler et al. | 700/259 |
| 2010/0143089 | A1* | 6/2010 | Hvass et al. | 414/754 |
| 2010/0227527 | A1* | 9/2010 | Smoot et al. | 446/362 |
| 2011/0172822 | A1* | 7/2011 | Ziegler et al. | 700/259 |
| 2011/0288684 | A1* | 11/2011 | Farlow et al. | 700/264 |

* cited by examiner

*Primary Examiner* — Ronnie Mancho
(74) *Attorney, Agent, or Firm* — Marsh Fischmann & Breyfogle, LLP; Jon P. Deppe; Kent A. Lembke

(57) ABSTRACT

A drive system is presented for controlling rotation of a sphere. The system facilitates holonomic motion of a drive with respect to a sphere such that a holonomic drive or drives may be maintained at a relative position with respect to a sphere. The motion of a sphere may be controlled by controlling the position of a drive with respect to the sphere. The drive may be controlled by way of a controller. A holonomic drive may be urged against a sphere by way magnetic interaction of the holonomic drive and a second structure. Also, a support structure is facilitated that allows a sphere to pass through a support column without breaks or interruptions in the sphere.

20 Claims, 12 Drawing Sheets

MAGNETIC SPHERICAL BALANCING ROBOT DRIVE

FIELD OF THE INVENTION

The present invention relates, generally, to a robotic drive system. Specifically, the present invention relates to a robotic system having a drive in contact with a sphere such that the drive is operable to control rotation of the sphere.

BACKGROUND OF THE INVENTION

Ambulatory robotic systems may generally be categorized into one of two classes. The first of these classes includes ambulatory robotic systems that are statically stable. The second class includes ambulatory robotic systems that are dynamically stable. Statically stable ambulatory robot systems are stable when unpowered, whereas dynamically stabilized ambulatory robotic systems include active, powered mechanisms to stabilize the system. In this regard, statically stable ambulatory robots generally have a lower center of gravity with a larger footprint in order to passively maintain stability without the intervention of active sensors or actuators. Dynamically stabilized ambulatory robots generally include control structures and actuators that actively maintain the stability of the ambulatory robot. As such, dynamically stabilized ambulatory robots can have a smaller footprint because these robots are dynamically stabilized by the robot "balancing." This balancing may include the control of actuators in response to a sensed position or change in position to maintain stability.

Dynamically stabilized ambulatory robot platforms have been used in applications to produce an entertaining or whimsical effect. Such effects result from the dynamically stabilized ambulatory robot remaining stable when the system appears, from the perspective of a casual observer, as though the system should not remain stable. For instance, Segway™ devices are dynamically stabilized two wheeled ambulatory robotic systems that use gyroscopes and other mechanisms to dynamically maintain the stability of the system. Such devices may also provide for propulsion of an ambulatory robotic system along a plane or surface. These systems have been used successfully in the past to stabilize and propel robotic systems for utilitarian as well as entertainment purposes. However, due to limitations of these systems, the utilitarian as well as entertaining applications of these systems are limited.

For instance, as the understanding of the technology behind these types of dynamically balanced systems has become more widespread, the understanding of these systems by the general public has increased such that the entertainment value and/or whimsical nature of these types of platforms lessens due to people being aware of and understanding the principles governing such systems.

Additionally, some of these two wheeled dynamically stabilized ambulatory robotic systems are non-holonomic, and thus the range of motion is limited for these systems. Holonomic, in the field of robotics, refers to a system's ability to independently control all degrees of freedom of the system. For instance, an ambulatory robot designed to move about a surface or plane may generally exhibit at least three degrees of freedom. These may correspond to translation in both axes of the plane as well as rotation in a direction generally perpendicular to the plane. In order to be holonomic, the robot must be able to fully move in any one of these degrees of freedom independently of any other degree of freedom. For example, the ambulatory robotic system must be able to move in any direction along the plane without rotating in a direction perpendicular to the plane (e.g., move side to side and front to back without first turning or rotating).

As such, non-holonomic ambulatory robotic systems may be limited in the range of motion capable of being produced. This is a particular disadvantage when using these robotic systems for entertainment purposes. For instance, when using these non-holonomic ambulatory robotic systems as platforms for animatronic characters, puppets, operators, props, or the like, the limited range of motion may spoil the illusion that an operator or object is in fact balancing on or controlling the movement of the robotic system.

One system that addresses some of the limitations of two-wheeled dynamically stabilized or statically stabilized ambulatory robotic systems is presented in U.S. Patent Application Publication No. 2008/0024175 by Hollis, which is hereby incorporated by reference in its entirety. This robotic system includes a controller capable of achieving dynamic balancing by way of controlling actuators. The robot includes fiber optic gyroscopes and electromechanical accelerometers to measure the position and dynamics of the dynamic balancing mobile robot. In turn, the controller is operative to control a plurality of actuators in conjunction with a ball upon which the platform is dynamically balanced.

However, the robotic system shown in the '175 publication has several drawbacks and limitations. For instance, the mobile robot device operates by way of a reverse mouse wheel type design. In such a design, the entire system is supported by, and dynamically balanced on, a ball or sphere. The actuators for controlling the ball in order to dynamically balance the system must be positioned precisely at the equator of the sphere to facilitate holonomic control over the supporting ball. In this regard, at least half of the ball is obstructed by the system, thus minimizing the visibility of the ball. Again, when used in an entertainment application, such obstruction of the ball that occurs in the '175 publication reduces the entertaining effect because the mystique associated with the illusion that the ball is controlled by an animatronic character, puppet, or the like is destroyed. That is, the illusion that a character or puppet is controlling the ball is diminished as a large portion of the ball must be covered.

Therefore, the prior art contains no ambulatory robotic system that is capable of holonomic motion along a surface while obscuring a relatively small amount of the sphere or ball upon which the locomotive and balancing forces are applied.

SUMMARY OF THE INVENTION

In this respect, the present invention facilitates a robotic holonomic system. The robotic holonomic system may include a sphere and a drive capable of interacting with the sphere to control rotation of the sphere. In an embodiment, the system may include a controller that is operative to determine the position and/or movement of the drive in space and in turn, control the drive (e.g., move with respect to the sphere) in order to balance the system or produce motion of the system with respect to a surface. As such, the system may be dynamically balanced.

The system may utilize magnetic interaction to facilitate contact of the drive against the sphere. In this regard, the drive may contact the sphere such that a relatively small amount of the sphere is covered or obstructed from view by the drive. The drive may magnetically interact with the sphere itself, or another magnetic structure to maintain contact between the sphere and the drive.

Moreover, the present invention facilitates a robotic system that may be statically supported. The statically supported system may include a support structure including a locomotive driver. In turn, the support structure may magnetically interact with a second structure through a sidewall of a sphere. In this regard, the sphere may be allowed to pass between the support structure and the second structure, while the magnetic interaction between the support structure and the second structure may allow the two structures to remain in a relative position with regard to one another. As such, the support structure may support the second structure, while the magnetic interaction of structures may allow the sphere sidewall to pass between the two without disruption of the magnetic interaction between the structures. This may facilitate movement of the sphere along a surface while supporting an object, such as an operator, an animatronic character, a puppet, a prop, or the like. Accordingly, the object may remain at a relative location with respect to the sphere while the sphere rotates below the object such that no breaks or interruptions in the sphere are needed to facilitate supporting the object.

In this regard, a first aspect of the present invention includes a magnetic holonomic drive system including a substantially spherical body having a surface portion. The system further includes a holonomic drive having at least one multidirectional wheel contacting the surface portion of the substantially spherical body, and a holding magnet assembly on the holonomic drive that is operative to urge the at least one multidirectional wheel against the surface portion of the substantially spherical body. The substantially spherical body may be controlled in response to rotation of said multidirectional wheels.

Various refinements exist of the features noted in relation to the first aspect of the present invention. These refinements and additional features may exist individually or in any combination. For instance, various features discussed below in relation to any of the exemplary embodiments of the present invention may be incorporated into the first aspect of the present invention alone or in any combination. The following discussion is applicable to the first aspect, up to the start of the discussion of a second aspect of the present invention.

One embodiment of the magnetic holonomic driver system includes a control system that is responsive to one or more sensors and is operable to control rotation of the at least one multidirectional wheel to position the holonomic drive in a relative position with respect to the substantially spherical body to control rotation of the substantially spherical body. The control system may include a processor in operative communication with an inertial measuring unit. The processor may interpret an output of the inertial measuring unit to generate at least one control signal that is communicated to a motor engaged with the at least one multidirectional wheel.

In another embodiment, the holonomic drive may also include a mast operatively connected to the holonomic drive and extending away from the substantially spherical body. The control system may be operative to monitor the orientation of the mast and control the at least one multidirectional wheel of the holonomic drive to maintain the mast in a substantially vertical orientation. That is, the holonomic drive may be moved below the mast to maintain the mast in a substantially vertical orientation. As such, the mast may form a pendulum portion of an inverted pendulum balancing system. Accordingly, the control system may balance the inverted pendulum such that it remains in a substantially upright, and balanced position with respect to the sphere. Any movement of the mast away from vertical may in turn result in a corresponding change in position of the drive to counter the movement from vertical which may result in movement of the drive and sphere, thus providing an overall direction of translation for the entire assembly.

In an embodiment, the mast supports an object. The object may be animate or inanimate. The object may include an operator, an animatronic character, a puppet, a prop, or a combination thereof. The object may be capable of producing movement of the mast in an orientation other than vertical, which may be in turn countered by motion of the drive. In one embodiment, the object may be an operator that controls the position of the mast and may move the mast from a substantially vertical orientation (e.g., by leaning or balancing to control the movement of the mast). The drive, in turn may move as described above to counter such motion of the mast and thus impart a movement of the sphere. Thus, movement of the mast may be used to control the motion of the system along a plane. Alternatively, the object may also be passive such that movement of the drive with respect to the sphere initiates and controls movement of the sphere.

In another embodiment, the substantially spherical body may include a ferrous or magnetic material such that the holding magnet assembly magnetically interacts with the substantially spherical body to urge the holonomic drive against the sphere's surface. In this regard, the spherical body may be made of a magnetic or ferrous material. Additionally or alternatively, the spherical body may have magnetic elements imbedded therein to facilitate magnetic interaction with the magnetic holding assembly.

In yet another embodiment, the substantially spherical body includes a nonferrous material and the system may include a magnetic structure interacting with the holonomic drive to maintain the drive against the surface portion of the substantially spherical body. The magnetic structure may comprise any number of mechanisms or structures including, but not limited to, rollers, gimbaled rollers, castored rollers, ball bearing rollers, or another appropriate low friction surface or device capable of magnetic interaction with the holonomic drive. In one embodiment the magnetic structure may be a second holonomic drive. The second holonomic drive may have at least one second multidirectional wheel contacting a second surface portion of the substantially spherical body and a second holding magnet assembly. The second holding magnet assembly, in cooperation with the first holding magnet assembly, may be operative to urge the first and second holonomic drives against the first and second surface portions, respectively. Accordingly, the spherical body may be allowed to pass in between the first and second holonomic drives while maintaining the first and second holonomic drives in position with respect to one another in response to rotation of the first and second multidirectional wheels.

In another embodiment, the system may further include a counterweight that is attached to and extends away from the magnetic structure disposed within an interior of the substantially spherical body such that the counterweight is disposed entirely within the interior of the substantially spherical body. In yet another embodiment, the holonomic drive may cover an area less than about 10% of a total area of the surface portion.

A second aspect of the present invention includes a vehicle capable of moving with respect to a surface. The vehicle includes a substantially spherical body defining an interior volume and having a sidewall with an interior surface and an exterior surface. The vehicle further includes a locomotive drive within the interior volume that is supported on the surface and is engageable with the interior surface to produce rotation of the substantially spherical body such that the substantially spherical body rotates along the surface. In one embodiment, the locomotive drive may be a holonomic drive.

The vehicle further includes a support beam attached to the locomotive drive and extending away from the locomotive drive. Also, the vehicle includes an interior support operatively attached to an end of the support beam opposite the locomotive drive. The interior support contacts the interior surface and includes a first magnetic holding portion. The vehicle also includes an exterior support contacting the exterior surface of the substantially spherical body on an opposite side of the sidewall as the interior support. The exterior support has a second magnetic holding portion in magnetic interaction with the first magnetic holding portion to produce an urging force relative to said interior and exterior supports.

Various refinements exist of the features noted in relation to the second aspect of the present invention. These refinements and additional features may exist individually or in any combination. For instance, various features discussed below in relation to any of the exemplary embodiments of the present invention may be incorporated into the second aspect of the present invention alone or in any combination. The following discussion is applicable to the second aspect, up to the start of the discussion of a third aspect of the present invention.

In one embodiment, the interior support may be a castored or gimbaled cylindrical magnet held against the top inside of the sphere that magnetically attracts the exterior support which may also be a castored or gimbaled cylindrical magnet. Thus the external cylindrical magnet may be constrained to roll along with the internal cylindrical magnet. Alternatively, both of the interior and exterior supports may be a holonomic drive. Further still, the exterior support may include an object such as an operator, an animatronic character, a puppet, a prop or a combination thereof.

A third aspect of the present invention includes a method for controlling a robotic system. The method involves sensing a position of a holonomic drive in contact with a sphere, determining a correction command necessary to affect a desired change in position of the holonomic drive, generating a control signal including information about the correction command, and rotating at least one multidirectional wheel in contact with the sphere to affect movement of the drive with respect to the sphere corresponding to the correction command.

DETAILED DESCRIPTION OF THE DRAWINGS

Figure 1A:
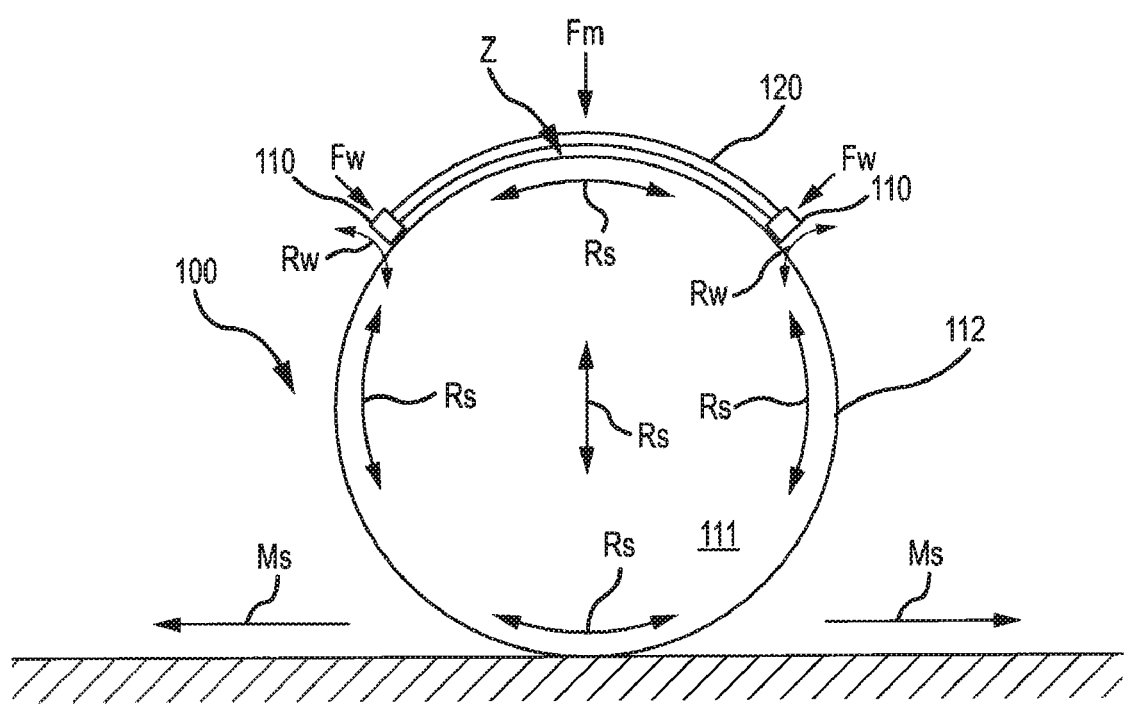
FIGS. 1A-C are section views of different embodiments of a magnetic holonomic drive system taken along a centerline of the system.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

Figure 1B:
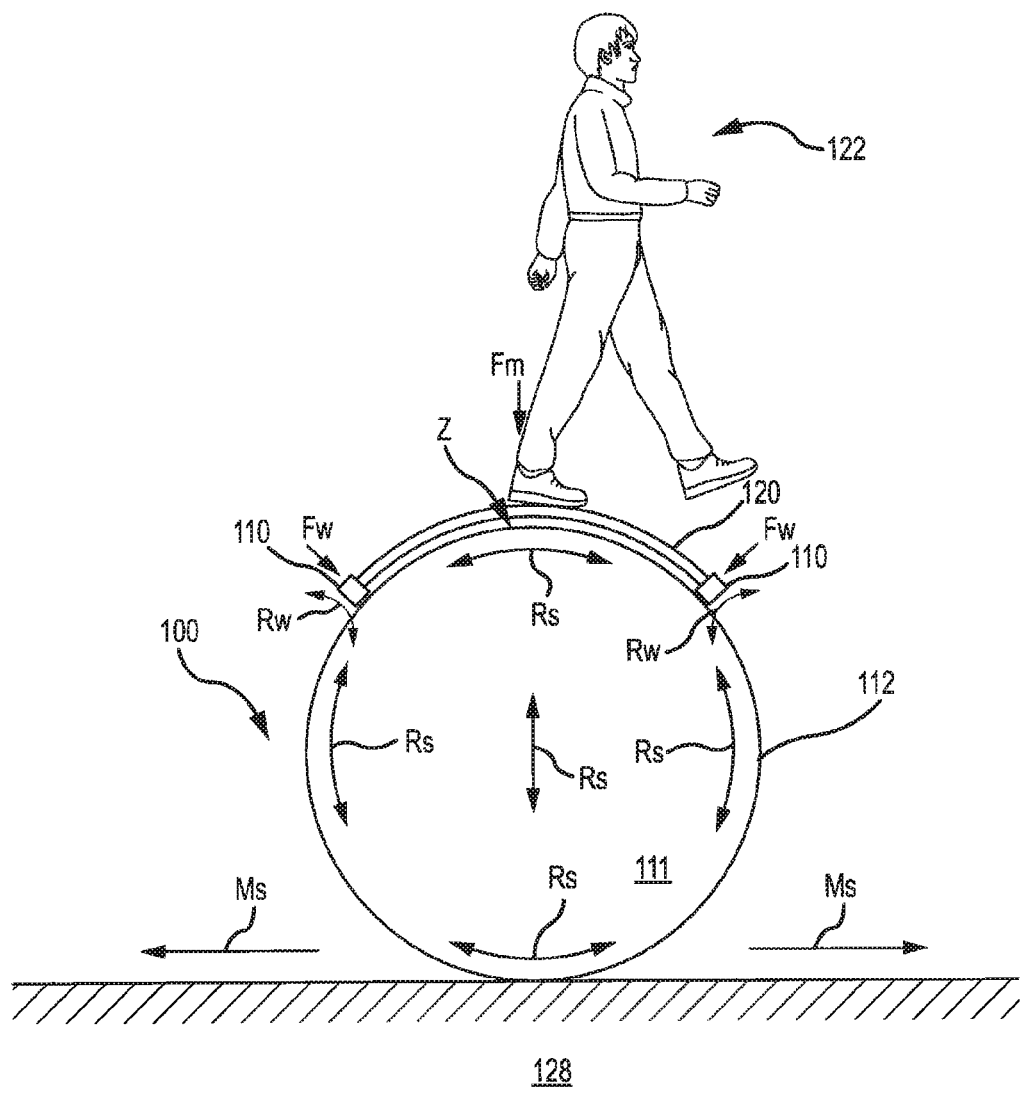
Figure 1C:
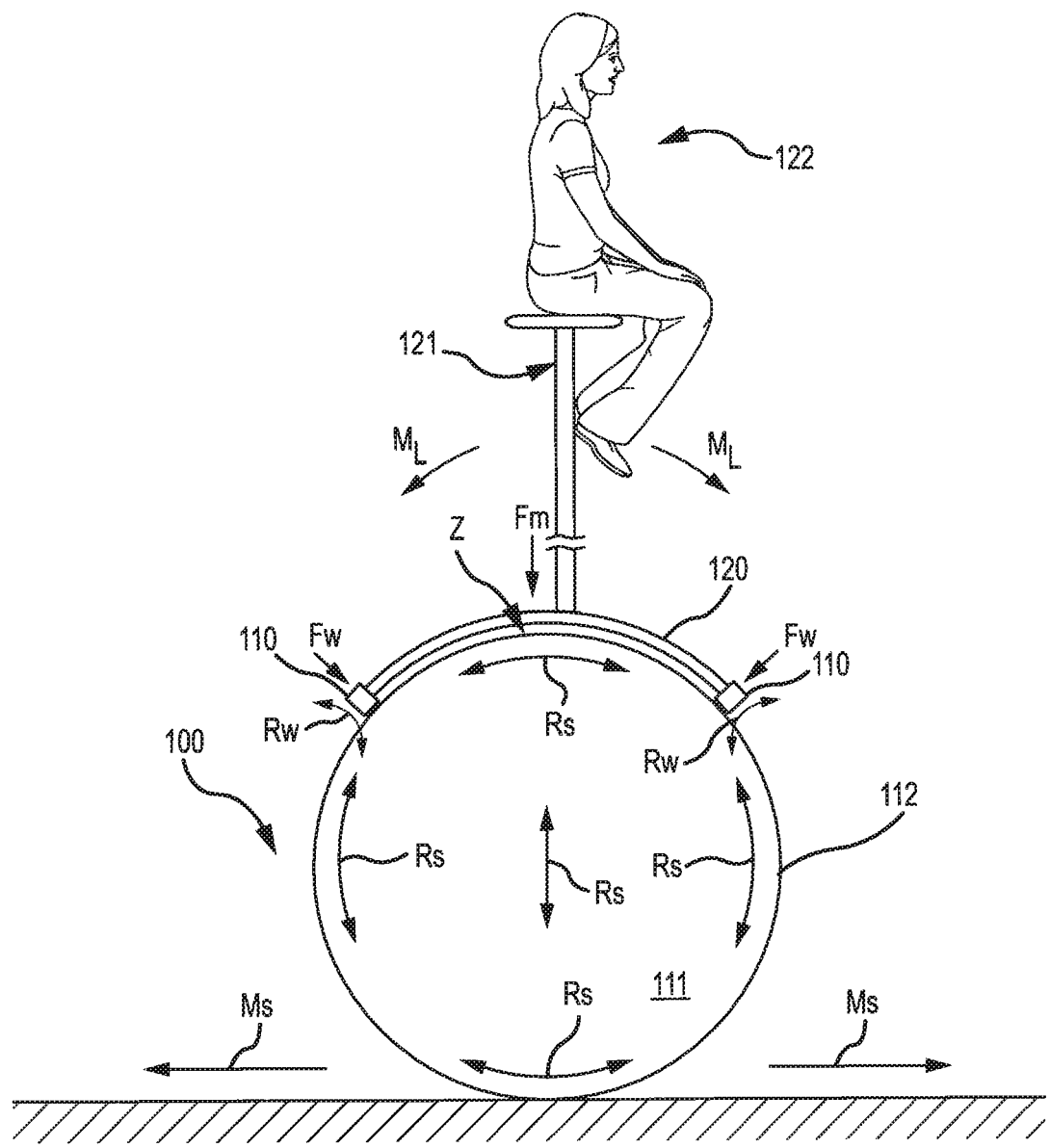
Figure 2:
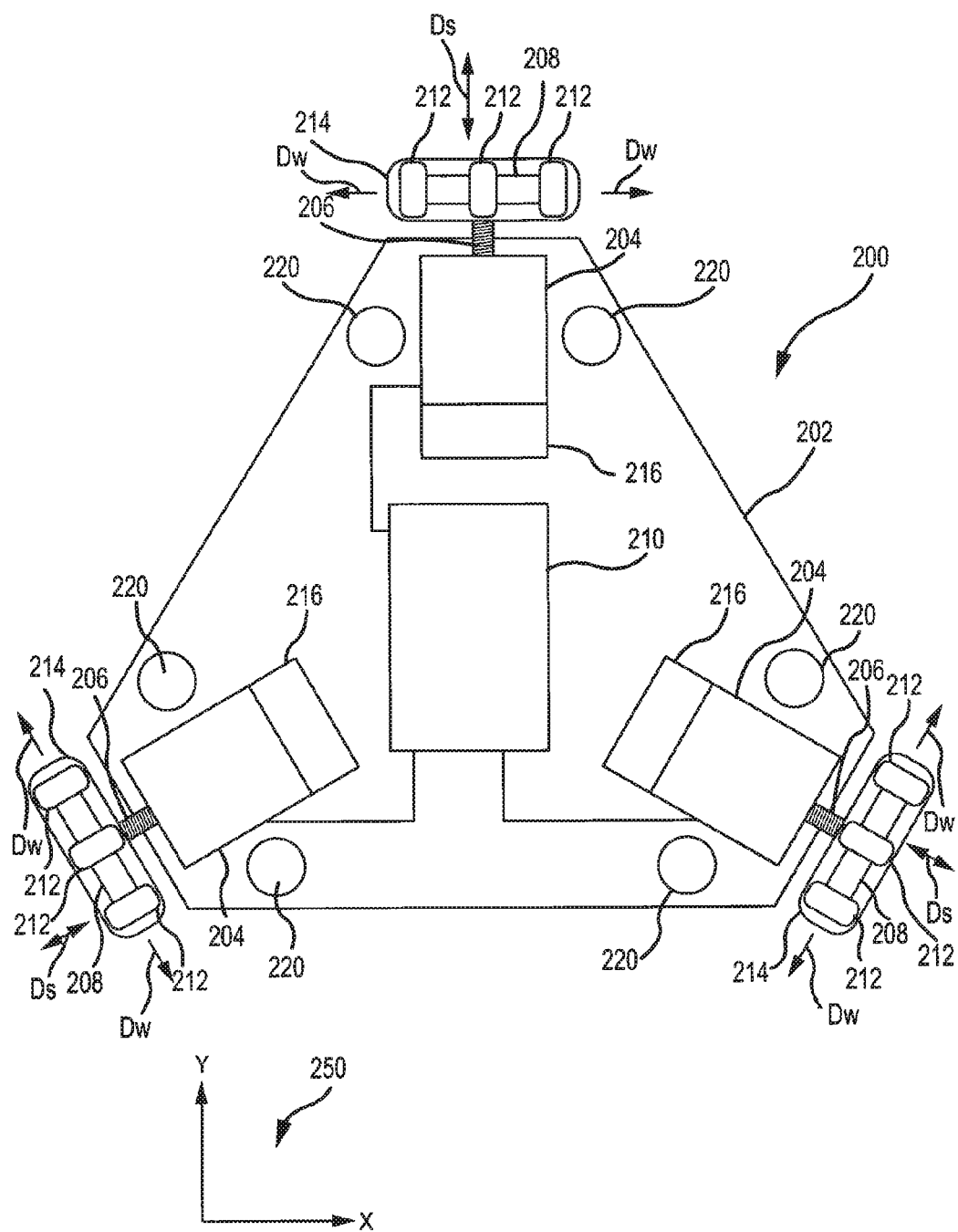
FIG. 2 is a schematic view of an embodiment of a holonomic drive.
Figure 3:
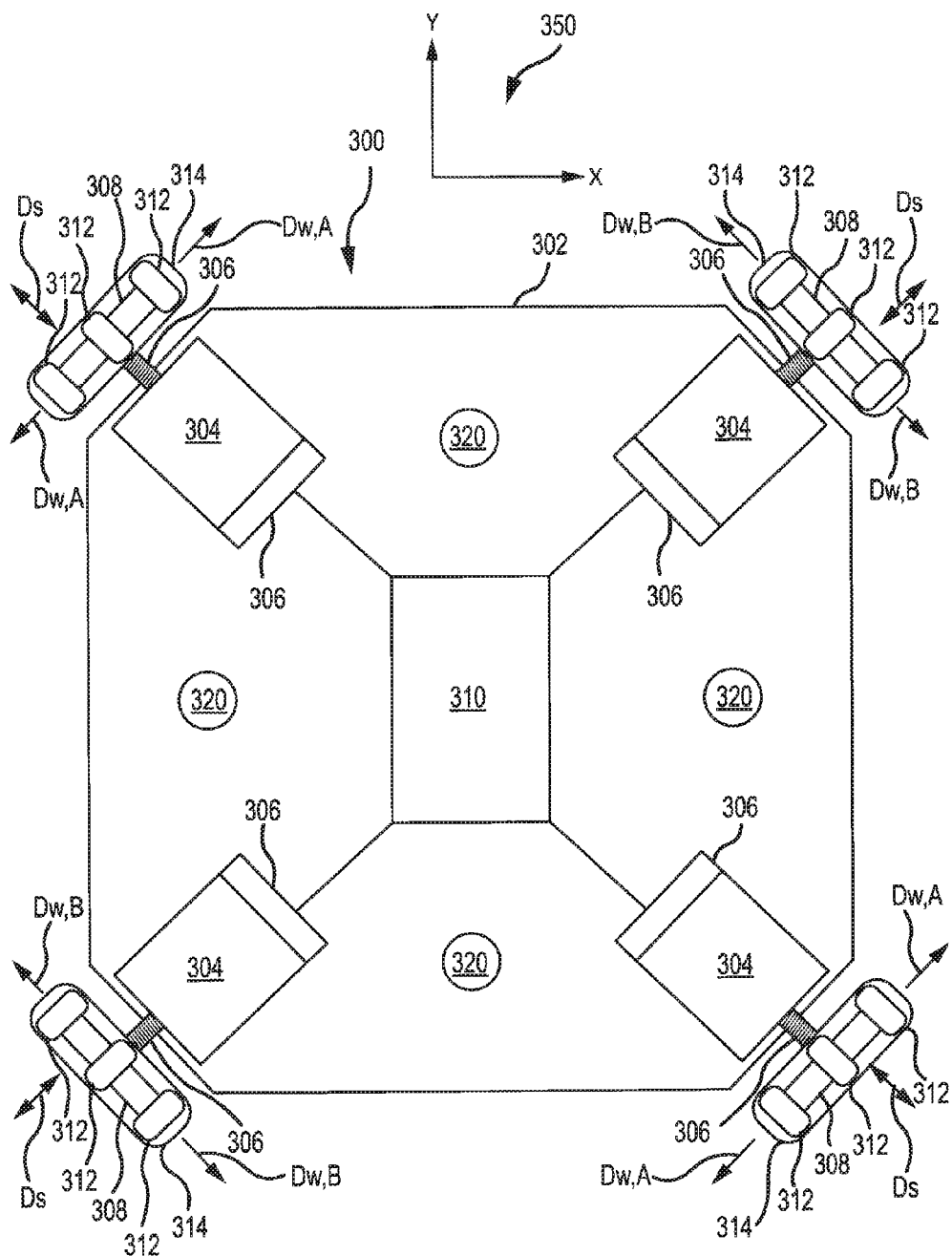
FIG. 3 is a schematic view of another embodiment of a holonomic drive.
Figure 4:
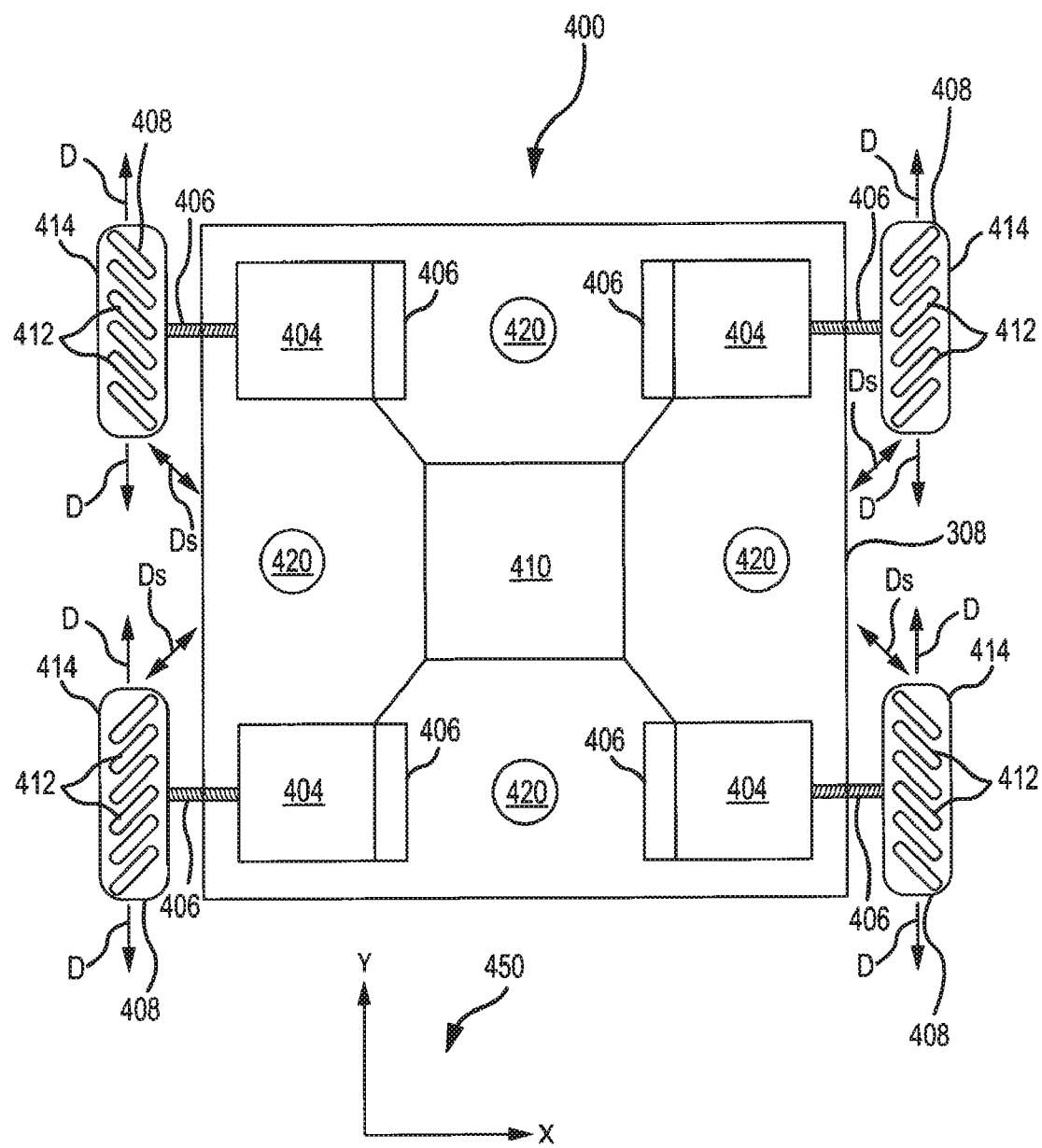
FIG. 4 is a schematic view of yet another embodiment of a holonomic drive.

The following description will first describe generally a holonomic drive system with reference to FIGS. 1A-C. With further reference to FIGS. 2-4, various embodiments of holonomic drives are presented. A control system and its operation is shown and described with reference to FIG. 5. FIGS. 6-10 generally show alternative embodiments of drive systems.

FIG. 1A illustrates one embodiment of a holonomic drive system 100. The system 100 may include a sphere 111 defined by a sphere sidewall 112. Furthermore, the system 100 may include a holonomic drive 120 including one or more multidirectional wheels 110. The drive 120 may be urged against the sidewall 112 by the action of forces (e.g., Fm, Fw) acting on the drive. The urging of the drive 120 against the sidewall 112 may maintain the multidirectional wheels 110 in contact with the sidewall 112. Thus, the multidirectional wheels 110 may be rotated (Rw) to move the drive 120 with respect to the sphere 111 or match rotation (Rs) of the sphere 111. That is, the drive 120 may move in any manner with respect to the sphere 111 in light of the holonomic nature of the drive 120, as will be described further below. In one regard, the drive 120 may move with respect to the sphere 111 such that the drive 120 remains substantially adjacent to the zenith (Z) of the sphere. As such, the center of gravity of the system may be maintained substantially above the center of support (i.e., the location at which the sphere 111 contacts the surface 128) such that the sphere 111 rests on a surface 128 without substantial movement of the sphere 111 along the surface 128.

To produce motion (Ms) of the sphere 111 along the surface 128, the drive 120 may move away from the zenith (Z) (e.g., in the direction of desired travel). As such, the center of gravity may be moved from above the center of support in a direction corresponding to a desired movement of the sphere 111. Because of the imbalance of the system created by moving the center of gravity of the system from above the center of support of the system, the drive may begin to "fall" or cause the sphere to rotate in the direction of the imbalance. That is, the sphere 111 may begin to rotate in the direction of the "falling" drive 120. The drive 120 may then be driven to match the rotation of the sphere 111 such that the drive 120 remains slightly offset from the zenith (Z) in the desired direction of travel or returns to the zenith (Z) and matches the rolling speed of the sphere 111. To slow the sphere, the drive 120 may move to a position corresponding to the opposite side of the sphere 111 in the direction of rotation of the sphere. As such, the center of gravity of the system may move such that rotation (Rs) of the sphere 111 is slowed or substantially stopped. The drive 120 may return to the zenith (Z) such that the center of gravity is moved back over the center of support and the system 100 may remain at rest.

The urging of the drive 120 against the sidewall 112 may be produced by way of magnetic interaction. For instance, the drive 120 may include magnets positioned on the drive 120. These magnets may magnetically interact with a structure so as to produce an urging force (Fm). It will be appreciated that the urging force (Fm) may include force vectors (Fw) acting on the multidirectional wheels 110 so as to force the wheels 110 against the sidewall 112. The force vectors (Fw) may produce sufficient force such that the drive 120 remains engaged with the surface of the sphere 111 such that the drive 120 may move with respect to the sphere 111 and remain positioned thereon as described above.

As depicted in FIG. 1B, the drive 120 may support an object 122. The object 122 may be animate (e.g., a human operator or other moving device) or may be inanimate. For instance, object 122 may be an operator, an animatronic character, a puppet, a prop or a combination thereof. Accordingly, motion of the driver 120 and sphere 111 may be coordinated such that it appears the object 122 is riding or otherwise transported by the sphere 111. As one representative example, the holonomic drive system 100 may be used in an entertainment application. For example, the drive 120 may serve as a mounting structure for an animatronic character, puppet, operator, actor, or other individual or device used for entertaining The object 122 may be positioned directly on the drive 120 such that it appears that the object 122 manipulating the sphere 111 to produce the rotation (Rs) imparted by way of the drive 120 (e.g., it may appear as though a character is standing on the ball and manipulating the ball by way of the characters legs or feet). Because the drive 120 may be maintained at a relative position with respect to the sphere 111 (e.g., the zenith (Z)), a character or the like may be positioned so that it appears that the character is balancing on, or riding on, the sphere 111.

Alternatively, as shown in FIG. 1C, motion of the sphere may be used to balance a mast 121 attached to holonomic drive 120. The mast 121 may support an object 122. The object 122, again, may be animate (e.g., a human operator or other moving device) or inanimate. The object 122 may comprise, along with the mast 121 an inverted pendulum. In this regard, the mass of the object 122 and the mast 121 may be generally supported over the drive 120 such that the mast 121 is arranged at or near vertical and the center of gravity of the system is positioned over the center of support. The object 122 may be mounted or positioned on a platform atop the mast 121, to appear much as an unicyclist does as he rides his vehicle. The rotation (Rs) and movement (Ms) of the sphere 111 may be controlled by an operator or may be choreographed such that the rotation (Rs) of the sphere 111 produced by movement of the drive 120 is predetermined to coordinate with a show or movement of a character. Additionally or alternatively, an operator may be supported by the drive 120 and have control thereof, such that the operator controls the rotation (Rs) and in turn movement (Ms) of the sphere to interact with bystanders, park patrons, audience members, or the like.

In case illustrated in FIG. 1C, the drive 120 may be moved or positioned with respect to the sphere to a position that reduces the amount of tilt in the orientation of the mast 121 from vertical. The mass of the mast 121 and object 122 may be larger than the mass of the drive 120 and sphere 111. The drive 120 may be able to move with respect to the sphere 111 in order to maintain or return the angle of the mast 121 to near vertical. Accordingly, much like balancing a broomstick on a finger, the drive 120 may move under the mast 121 to maintain the mast in a vertical orientation.

In this regard, motion ($M_L$) of the mast 121 tending to move the mast 121 from a vertical position may in turn produce a response from the drive 120 attempting to restore the vertical orientation of the mast 121. This may result in a corresponding motion of the sphere 111. Accordingly, motion of the mast 121 may be used to control the direction of travel of the sphere 111 along a surface 128.

The drive 120 may be configured such that the contour of the sphere 111 is accommodated by a curved or angled drive body. It will be understood that the amount of such curving or angling may correspond to the contour of the sphere 111 such that when the urging force (Fm), including the force vectors (Fw), act upon drive 120, the drive 120 does not contact the sphere 111 other than at the points of contact of the multidirectional wheels 110. For instance, a substantially flat drive 120 may be used if the sphere contour in the area of the drive 120 is minimal, such that the sphere 111 would not contact the drive 120 apart from the contact of the multidirectional wheels 110 (e.g., in the case of a relatively large sphere 111 with respect to the drive 120).

The drive 120 may obscure or cover a relatively small portion of the sphere 111. For instance, in one embodiment a drive covers or obscures less than about 10% of a surface area of a sphere. Magnetic interaction of the drive 120 may be produced between magnets and the sphere 111. That is, the sphere 111 may be constructed of a ferrous or magnetic material and the drive 120 may include magnets. Alternatively, the sidewall 112 may contain a ferrous or magnetic material at or below the surface of the sphere 111 (e.g., magnetic elements imbedded in the sidewall) to facilitate magnetic interaction between the sphere 111 and the drive 120. In alternative embodiments, a magnetic structure other than the sphere 111 may be used to magnetically interact with the drive 120 to produce the urging force (Fm) as will be described in more detail below.

Turning to FIG. 2, an embodiment of a holonomic drive 200 is depicted. The holonomic drive 200 may be used, for instance, in a holonomic drive system 100 depicted in FIG. 1. The drive 200 may include a chassis 202 that may have a generally triangular shape such that three corners of the chassis body 202 are each offset by roughly 120 degrees. At each of these corners, there may be a motor 204. Additionally, a controller 210 may be provided in communication with the motors 204 such that the controller 210 may independently drive each motor 204. A representative example of the construction and operation of the controller 210 will be described with greater detail below with respect to FIG. 5. Each motor 204 may include a motor shaft 206 that is connected to a multidirectional wheel 208.

The multidirectional wheels 208 may be omni wheels or poly wheels such that the circumference of the multidirectional wheel 208 includes a plurality of circumferential rollers 212 that may have a rolling direction (Ds) different than the rolling direction (Dw) of the main wheel body 214. In this regard, while the multidirectional wheels 208 may roll in a direction (Dw) associated with the axis of rotation about the main wheel body 214, the multidirectional wheels 208 may also slip by way of rotation of the circumferential rollers 212 along a different direction (Ds) (e.g., that may be perpendicular to the rolling direction (Dw) of the main wheel body 214). That is, the circumferential rollers 212 may provide a rolling direction (Ds) offset from the rolling direction (Dw) of the main wheel body 214. Additionally, the motors 204 may include an encoder 216 capable of determining the angular position of the motor shaft 206. The encoders 216 may communicate with the controller 210 to provide feedback to the controller 210 regarding the position and operation of the motors 204 and multidirectional wheels 208 for use in controlling the drive 200 as will be discussed further below.

As stated above, each motor 204 may be independently controlled by the controller 210. In this regard, the drive 200 may move in any degree of freedom of the drive 200 with respect to the XY plane (as described by the coordinate system 250) independently from any other of the degrees of freedom. In this case, there may be three degrees of freedom defined with respect to the XY plane. The first degree may be translation in the X direction, the second degree may be translation in the Y direction, and the third degree may be rotation perpendicular to the XY plane. The drive 200 may move in any of these degrees of freedom in the XY plane independently. Thus, the drive 200 may be holonomic. Stated another way, the drive 200 may be capable of producing movement in the XY plane, in any direction, without rotating perpendicular to the XY plane. This may be facilitated by the controller 210 independently controlling the plurality of multidirectional wheels 208 and by the circumferential rollers 212 allowing the main wheel bodies 214 to slip in a direction (Ds) offset from the rolling direction (Dw) of the main wheel body 214. This may facilitate the ability of a drive to move with respect to a sphere in any direction.

The drive 200 may include a plurality of magnets 220 positioned on the drive chassis 202. These magnets may comprise rare earth magnets or other magnets capable of producing a powerful magnetic field. The magnets 220 may be positioned at a single point on a chassis or may be positioned at various locations on the chassis 202 as depicted in FIG. 2. Alternatively, the multidirectional wheels 208 or the components thereof (e.g., the main wheel body 214 or circumferential rollers 212) may comprise magnets 220. For instance, the circumferential rollers 116 or main wheel bodies 114 may comprise magnets 220 in lieu of or in addition to magnets 220 positioned on the chassis 202. Further still, other arrangements of magnets 220 may be provided, such as, corresponding non driven wheels adjacent to the multidirectional wheels 208 that comprise magnets 220.

The magnets 220 may interact with other magnetic or ferrous structures to impart a force upon the drive 200 in order to maintain the holonomic drive 200 in contact with a surface. In this regard, if the surface with which the drive 200 magnetically interacts is fixed or constrained (e.g., a ceiling of a room), rotation of the multidirectional wheels 208 may result in the drive 200 moving along the surface. Alternatively or additionally, if a surface with which the holonomic drive 200 interacts is free to move or unconstrained (e.g., a sphere resting on a surface), rotation of the multidirectional wheels 208 may result in the drive 200 moving with respect to the surface such that the underlying surface (e.g., a sphere) also moves. For example, the movement of the drive 200 may disrupt a system to initiate, maintain, or arrest motion of a system.

For example, in one embodiment the drive 200 may be in magnetic interaction with a sphere. In this regard, the drive 200 may magnetically interact with a surface of the sphere. The drive 200 may be controlled to move with respect to the surface of the sphere. For instance, the drive's own weight may be used to shift the center of gravity of the entire sphere/drive assembly.

Alternatively a mast is employed extending from the drive 200. In this regard, a controller may monitor and control the drive 200 or mast to reduce the tilt of the mast away from a vertical orientation. Thus, the drive 200 may be used to impart motion of the sphere along a surface by moving with respect to the sphere to manipulate the center of gravity of the sphere. Alternatively, the drive 200 may move with respect to the surface of the sphere to maintain the sphere in a constant or near constant position on the plane by maintaining the center of gravity of the sphere over the center of support of the sphere.

In another embodiment, the drive 200 may be used in conjunction with a magnetic structure (e.g., a structure on an opposite side of a sphere sidewall as the drive 200 to maintain contact between the drive 200 and the sphere). In this regard, a sphere sidewall may be nonferrous (e.g., a polymeric or rubber-like material). In turn, the drive 200 may magnetically interact with the magnetic structure such that the drive 200 and the magnetic structure cooperate to hold the sidewall of the sphere between the structure and the drive 200. As such, the interaction of the drive 200 and the magnetic structure may provide the necessary force (e.g., Fm or Fw as shown in FIG. 1) acting on the sidewall through the multidirectional wheels 208 such that multidirectional wheels 208 contact the sphere. The magnetic structure may be provided in various forms so long as the structure allows for low friction movement of a sphere sidewall with respect to the structure and is capable of magnetically interacting with a drive 200. For instance, a magnetic structure may include a low friction surface (e.g., rollers, gimbaled rollers, castored rollers, or ball bearing rollers) that magnetically interact with the drive 200. Alternatively, the magnetic structure could be a second drive of a similar construction to that of the drive 200.

Turning to FIG. 3, an alternative embodiment of a holonomic drive 300 is shown. The drive 300 may include four multidirectional wheels 308 arranged at four corners of a chassis 302. The drive 300 may include a controller 310 in communication with a plurality of motors 304. The controller 310 may be able to independently control the motors 304. The motors 304 may include a motor shaft 306 coupled to a multidirectional wheel 308. The multidirectional wheels 308 may comprise wheels of similar construction to the multidirectional wheels 208 described with reference to FIG. 2. In this regard, the multidirectional wheels 308 may roll in a first direction (Dw) corresponding to a rolling direction of a main wheel body 314 and also be capable of slipping in a direction (Ds) different than the first direction (Dw) by way of circumferential rollers 312 that may include a rolling direction (Ds) offset from that of the main wheel body 314.

The drive 300 may include a pair of multidirectional wheels 308 on opposite corners of the drive 300 that share a common main wheel rolling direction ($D_{W,A}$). Additionally, a pair of multidirectional wheels 308 on opposite corners of the drive 300 may share a common main wheel rolling direction ($D_{W,B}$). The rolling direction ($D_{W,A}$) may be generally perpendicular to the rolling direction ($D_{W,B}$). As such, the drive 300 may have two pairs of multidirectional wheels 308 that roll in generally perpendicular directions. This may facilitate, in conjunction with the circumferential rollers 312 providing perpendicular rolling directions ($R_S$), fully independent movement of the drive in all degrees of freedom.

As such, drive 300 of FIG. 3 may be holonomic (e.g., move in all degrees of freedom independently within the XY plane as defined by the coordinate system 350). The drive 300 may control translational movement within the XY plane as well as rotation in a direction perpendicular to the XY plane. Notably, movement in each of these degrees of freedom may be accomplished without having to reposition or move in any of the other degrees of freedom. That is, selective control of the multidirectional wheels 308 may produce linear motion in the X or Y direction or a combination thereof without requiring a drive 300 to turn or move in any other degree of freedom. Furthermore, the drive 300 may rotate in a direction perpendicular to the XY plane without translating in the plane.

The drive 300 may also include a plurality of magnets 320. These magnets 320 may comprise rare earth magnets or other magnets that may produce a strong magnetic field. The drive 300 may include magnets 320 positioned on the chassis 302 at various locations as depicted. Alternatively, a single magnet 320 could be positioned on a chassis. Additionally or alternatively, the multidirectional wheels 308 or the components thereof (e.g., the circumferential rollers 312 or the main wheel body 314) may comprise magnets 320. Further still, other arrangements of magnets 320 may be provided, such as corresponding non driven wheels adjacent to the multidirectional wheels 308 that comprise magnets 320.

The drive 300 may also be operative to magnetically interact with a surface (e.g., of a sphere) such that the drive 300 is capable of moving relative to the surface by way of rotation of the multidirectional wheels 308. In one embodiment, the magnetic interaction of the drive 300 with a surface may be accomplished using a ferrous sphere to which magnets 320 are attracted. By way of example, a ferrous sphere may comprise a sphere constructed of a ferrous or magnetic material or the sphere may include ferrous or magnetic material imbedded in the sphere or sphere sidewall. As such, magnets 320 may interact with the ferrous or magnetic material to urge the drive 300 against the sphere so that the multidirectional wheels 308 may rotate to in turn rotate the sphere or counteract rotation of the sphere. Alternatively, a drive 300 may magnetically interact with a magnetic structure to sandwich a sphere sidewall between the drive 300 and the magnetic structure in a manner as described with reference to the drive 200 of FIG. 2.

Turning to FIG. 4, another embodiment of a holonomic drive 400 is presented. The drive 400 may be similar to the holonomic drives 200 and 300 with the exception of the arrangement and form of the multidirectional wheels 408. As opposed to having two pairs of corresponding wheels on opposite corners of the drive (as is the case in FIG. 3), the drive 400 may include multidirectional wheels 408 arranged at the corners of the drive 400 such that all of the multidirectional wheels 408 include at least one shared rolling direction (D). The multidirectional wheels 408 of the drive 400 may comprise mecanum wheels. Mecanum wheels include a first rolling direction (D) and a plurality of circumferential rollers 412 arranged at an angle around the circumference of the wheel as shown and described by U.S. Pat. No. 3,876,255, which is hereby incorporated by reference in its entirety. In this regard, the multidirectional wheels 408 may include a rolling direction (D) of the main wheel body 414 as well as one or more rolling directions (Ds) corresponding to the circumferential rollers 412 that are different from the rolling direction (D) of the main wheel body 414. In turn, the rolling direction (Ds) may allow the multidirectional wheel 408 to slip in a direction (Ds) offset from the main direction of rotation (D). The multidirectional wheels 408 may be selectively controlled such that the drive 400 exhibits similar holonomic properties as the drives 200 and 300. That is, the drive 400 may independently move in any degree of freedom without having to turn or first move in another degree of freedom. Accordingly, the drive 400 may be used in a manner described with reference to drives 200 and 300 of FIGS. 2 and 3, respectively.

Figure 5:
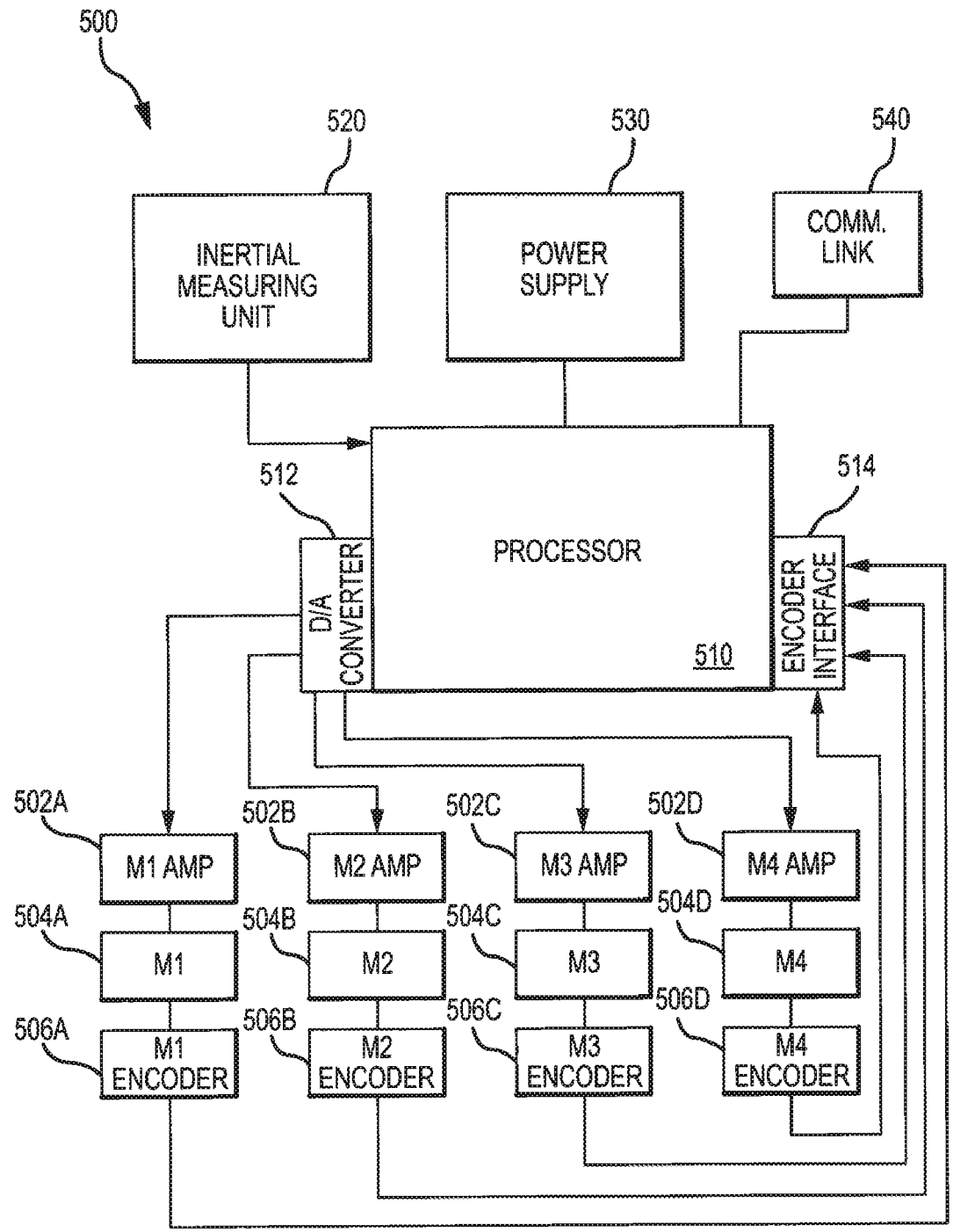
FIG. 5 is a schematic view of an embodiment of a controller.

FIG. 5 is a schematic drawing of an embodiment of controller 500 that may comprise the controllers 210, 310, and 410 previously described. Generally, the controller 500 may be similar in construction to the controller structure shown and described in U.S. Patent Application Publication No. 2008/0024175 by Hollis which is hereby incorporated by reference in its entirety. The controller 500 may include a processor 510. Additionally, the controller 500 may include an inertial measuring unit 520.

The inertial measuring unit 520 may include a plurality of sensors to determine the roll, pitch and yaw of a drive (e.g., a drive on which the controller 500 is located) as well as the pitch rate, roll rate and yaw rate of a drive. The inertial measuring unit 520 may further include sensors to monitor a position (e.g., position with respect to vertical) of a mast. These values may be determined by the inertial measuring unit 520 using fiber optic gyroscopes oriented orthogonally to one another, for example. Alternatively, a plurality of accelerometers or tilt sensors may be used. Additionally, the controller 500 may interpret signals provided by encoders 506A-D to determine at least some of these values. The inertial measuring unit 520 may communicate these values to the processor 510. In this regard, the processor 510 may be capable of monitoring the orientation as well as rate of change in orientation of a drive and/or vertical mast.

The processor 510 may further be in communication with a digital to analog (D/A) converter 512. The processor 510 may utilize a D/A converter 512 to communicate with a plurality of motors 504A-D. For example, motors 504A-D may comprise the motors 204, 304, or 404 shown in FIGS. 2, 3, and 4. The processor 510 may be capable of independently sending control signals to a plurality of motor amplifiers 502A-D. It will be understood that each motor 502A-D may include a separate channel of communication. That is, the controller 510 may, by way of the D/A converter 512, communicate on a channel A to a motor amplifier 502A to supply power to motor 504A. This may similarly be independently carried out on channels B-D to correspondingly control motors 504B-D. Each channel A-D may be separately in communication with the processor 510 such that motors 504A-D are independently controlled. Furthermore, motors 504A-D may have corresponding encoders 506A-D which monitor the angular position of motors 504A-D to resolve the position of motors 504A-D. In turn, encoders 506A-D may provide a signal through an encoder interface 514 to the processor 510. In turn, the processor 510 may be capable of monitoring the position of motor shafts of the motors 504A-D. The information regarding the angular position of the motor shafts may be used in a feedback loop of the controller to more accurately control a drive or to assist in determining the spatial position and change in position of the system.

The inertial measuring unit 520 may provide orientation information (roll, pitch, yaw, roll rate, pitch rate, yaw rate) to the processor 510. The processor 510 may in turn analyze the orientation information and generate, possibly using both the orientation information and the encoder information regarding the motor shaft positions, control signals for each motor 504A-D. These control signals may in turn be communicated to motor amplifiers 502A-D to independently control motors 504A-D to impart a force on the system to move the system. The control signals may control motors 504A-D to move a drive to counteract, initiate, or maintain rotation of a sphere by maintaining the drive in a specific position relative to the sphere (e.g., the zenith of the sphere such that the center of gravity at the system is over the center of support of the system). Alternatively, the control signals may control motors 504A-D to move a drive with respect to a sphere to induce or sustain motion of the sphere. Alternatively, the processor 510 may control motors 504A-D in order to maintain a mast in a vertical or near vertical orientation or to maintain a drive in a substantially balanced position (e.g., at the top of a sphere) while allowing a sphere, drive, and upright mast as an ensemble to translate in any direction on an underlying substrate.

The controller 510 further may include a power supply 530 that is capable of supplying power to the various components of the controller 510 (e.g., motors 504A-D, amplifiers 502A-D, etc.). Additionally, the controller 510 may include a communication link 540. The communication link 540 may comprise a wireless module (e.g., employing RF, Wi-Fi, or other appropriate wireless technology). The communication link 540 may transmit or receive data regarding the operation of the controller 510. For example, the communication link 540 may be operative to receive commands from an external source (e.g., an operator supported by a drive or elsewhere) to control the operation of a drive. Alternatively, the communication link 540 may be operative to transmit data regarding the operation of the controller 510. In this regard, diagnostic information may be transmitted via the communication link 540 for observation or troubleshooting of the system, if necessary. Further still, the communication link 540 may establish communication between the controller 510 and a second controller of a second drive. For instance, in the case where two drives magnetically interact on opposite sides of a sphere sidewall (as will be further described below), each of the drives may have a controller 510 including a communication link 540. The communication links of the two controllers may be in communication such that the operation of the two drives may be coordinated. For instance, one or more controllers (of the type described with regard to FIG. 5) may operate to control one or more holonomic drives.

Figure 6:
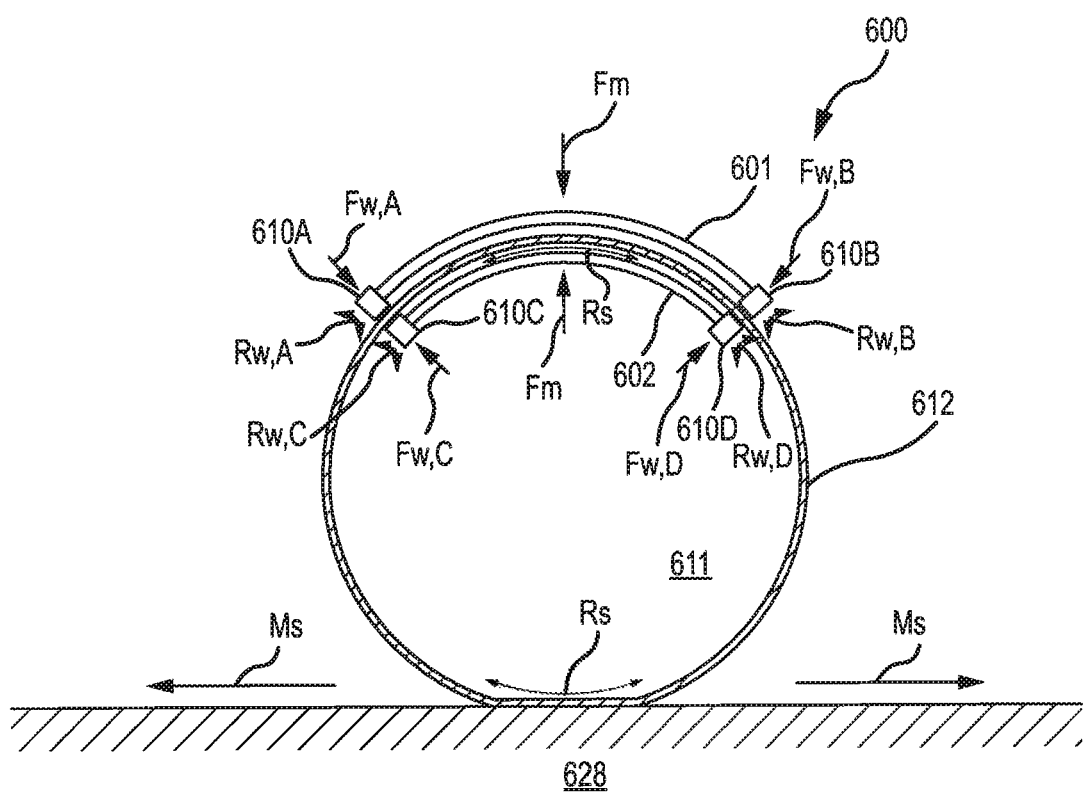
FIG. 6 is a detailed view of an embodiment of the magnetic holonomic drive system of FIG. 5.

For instance, one or more controllers may be used to control holonomic drives 601 and 602 of the holonomic drive system 600 as shown in FIG. 6. FIG. 6 depicts one embodiment of a holonomic drive system 600. In one particular embodiment, a sphere 611 comprising a portion of the system comprises a non-ferrous material. For instance, the sphere 611 may be made of a polymeric or rubber material. Additionally, the sphere 611 includes a sidewall 612. On opposing sides of the sidewall 612 may be an exterior holonomic drive 601 and an interior holonomic drive 602. The exterior drive 601 and interior drive 602 may be generally of similar construction as any one of the drives 200, 300, and 400 described with respect to FIG. 2, FIG. 3, and FIG. 4. Furthermore, the system 600 incorporates features of the system described with respect to FIGS. 1A-C.

As stated above, the system 600 may be arranged such that the drives 601, 602 are arranged on opposite sides of the sphere sidewall 612. As such, the interior drive 602 may be contained within an interior cavity of the sphere 611. In any regard, the drives 601, 602 are operative to magnetically interact in order to maintain relative positions on opposite sides of the sidewall 612. That is, by way of magnetic interaction between the interior drive 602 and the exterior drive 601, the drives are urged together by way of an urging force (Fm). Because the drives 601 and 602 are on opposite sides of the sidewall 612, the sidewall may be disposed therebetween. The magnetic interaction resulting in the urging force (Fm) may cause the drives 601, 602 to squeeze the sidewall 612 between the drives 601, 602. In one embodiment, the urging force (Fm) may include force vectors (Fw) acting on the multidirectional wheels 610 of the drives. In this regard, the multidirectional wheels 610A, 610B of the exterior drive 601 may contact the exterior surface of the sidewall 612 while the multidirectional wheels 610C, 610D of the interior drive 602 may contact the interior surface of the sidewall 612. Moreover, rotation (Rw) of the multidirectional wheels 610A-D of the drives 601, 602 may result in movement of the drives 601, 602 with respect to the sphere. In this regard, the rotation (Rw) of the multidirectional wheels 610 may be controlled in order to control the position of the drives with respect to the sphere 611.

In the system 600, it will be understood that the exterior 601 and interior 602 drives may be controlled in different ways to accomplish the control of the drives 601, 602 to produce movement of the drives 601, 602 with respect to the sphere 620. For example, the exterior drive 601 may include a controller that is capable of controlling the rotation (Rw) of the multidirectional wheels 610A, 610B. In turn, the interior drive 602 may include driven multidirectional wheels 610C, 610D that are also controlled.

Alternatively, the interior drive 602 may include passive wheels that are not actively controlled, but simply facilitate movement of the sidewall 612 between the two drives 601, 602. In the case where the multidirectional wheels 610C, 610D are driven, the interior drive 602 may include a controller. The controller of the interior drive 602 may have the same functionality as the controller of the exterior drive 601, such that the interior drive 601 controller is fully capable of controlling the interior drive 602 independently.

Alternatively, the interior drive 602 may include a slave controller and the exterior controller 601 may include a master controller. The master controller of the exterior drive 601 may communicate the control signals used to control the motors of the exterior drive 601 to the interior drive 602. This may be accomplished by way of a communication link (e.g., communication link 540 of FIG. 5) at both the exterior 601 and interior 602 drives. This slave controller may be operative to receive the control signals from the master controller and interpret those control signals to control the motors of the interior drive 602. For instance, it will be appreciated that, with alignment of the multidirectional wheels 610A and 610C and alignment of the multidirectional wheels 610B and 610D, rotation of the multidirectional wheels 610A and 610B and rotation of the multidirectional wheels 610C and 610D may be in substantially opposite directions in order to facilitate rotation (Rs) of the sphere 620 between the drives 601, 602. In this regard, the interior drive 602 slave controller may be operative to interpret control signals from the master controller of the exterior drive 602 to produce substantially mirrored control of the interior drive 602 to facilitate rotation (Rs) of the sphere 620. It will further be appreciated that while the forgoing has described the exterior drive 601 including a master controller and the interior drive 602 including a slave controller, the foregoing would also enable the interior drive to include a master controller and the exterior drive 602 to include a slave controller. Such a system, apart from the reversal of master/slave roles may have similar functionality as the foregoing description.

Figure 7:
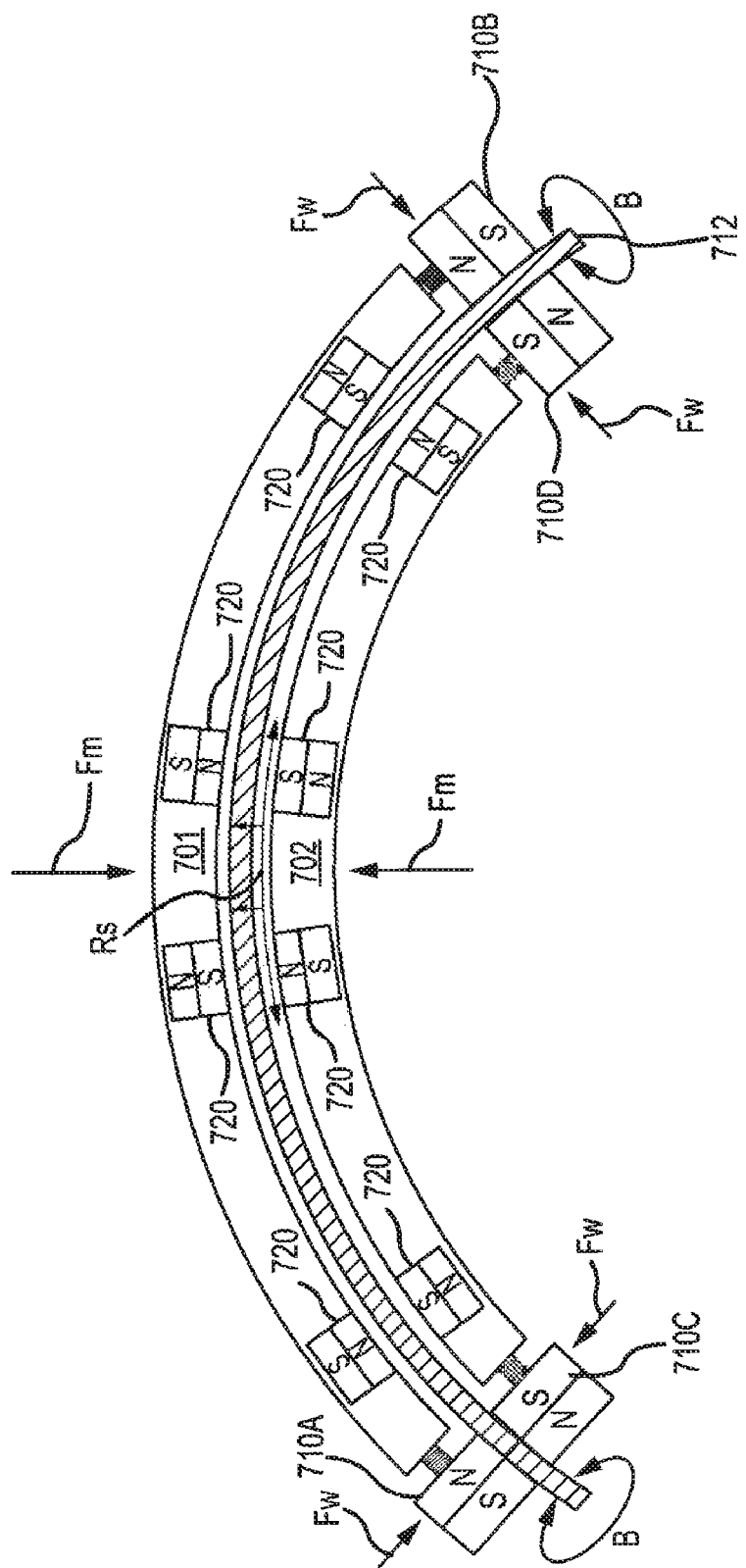
FIG. 7 is a partial view of an embodiment of a holonomic drive system.

A cutaway view of a holonomic drive system 700 is shown in FIG. 7. The system may include an exterior holonomic drive 701 and an interior holonomic drive 702. The drives 701, 702 may be adjacent to one another and on opposite sides of a sphere sidewall 712. It may be that the exterior drive 701 and interior drive 702 are maintained in such relative adjacent positions by way of magnetic interaction between the drives. The magnetic interaction between the drives 701, 702 may result in an urging force (Fm) that acts on the drives in order to sandwich a sidewall 712 between the drives. Additionally, a force vector (Fw) may result from the urging force (Fm) that acts on the multidirectional wheels 710 of the drives 701 and 702 to squeeze the sidewall 712. As such, rotation (Rw) of the wheels 710 may result in movement of the drives with respect to the sphere sidewall 712 sandwiched between the drives similarly described above with respect to the alternate embodiments.

The magnetic interaction between the exterior drive 701 and the interior drive 702 may be produced in various ways. For instance, the drives 701, 702 may include multidirectional wheels 710 that comprise magnetic material or are constructed from magnets. In this regard, complimentary magnet polarities may be provided on corresponding wheels of the exterior drive 701 and interior drive 702. That is, for instance, wheel 710A and 710C may have complimentary magnetic polarity alignment such that the two wheels interact and are urged together by force vector (Fw) to sandwich the sidewall 712 therebetween. Similarly, wheel 710B and 710D may have complimentary magnetic polarity alignment such that the two wheels interact and are urged together by force vector (Fw) to sandwich the sidewall 712 therebetween. The magnetic interaction between the corresponding multidirectional wheels 710 on opposite sides of the sidewall 712 may serve to align the corresponding multidirectional wheels 710. For instance, based on the arrangement of the magnetic polarities of the wheels 710, the alignment of the drives 701, 702 may be at least partially dictated by way of the magnetic interaction. Further still, magnets 720 may be positioned on the chassis of the drives 701, 702 such that the arrangement of the corresponding magnets 720 on the exterior drive 701 and the interior drive 702 may align the drives 701, 702 as well as provide the urging force (Fm) to sandwich the sidewall 712 between the drives 701, 702.

Alternatively, a single magnet may be provided on each of an exterior drive and an interior drive. For instance, the magnets may be positioned at the center or near the center of each of an exterior drive and an interior drive. However, if a single magnet is provided in with each drive, it will be recognized that the multidirectional wheels of the corresponding drives may not align as in the other embodiments presented. As a result, the drives may, by way of the magnetic interaction producing the urging force (Fm), be drawn together in the case of a pliable sidewall, such that the multidirectional wheels misalign and the drive bodies are brought into contact so as to pinch a sidewall between the drives. As such, in the case of a single magnet on each drive, it may be necessary to provide a rigid sphere to allow for the misalignment of the multidirectional wheels to prevent wrinkling or pinching of the sidewall.

Figure 8:
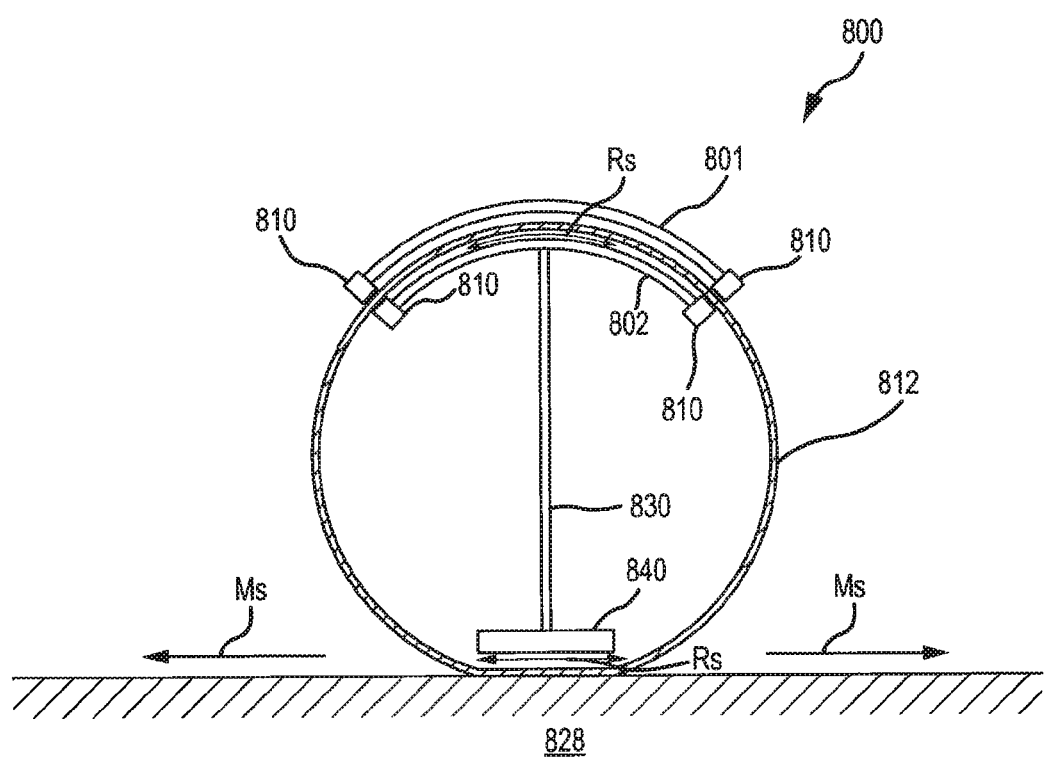
FIG. 8 is an embodiment of a holonomic drive system.

In FIG. 8, an alternate embodiment of a holonomic drive system 800 is depicted. The system 800 may be similar to the system 600 shown and described in FIG. 6 in that an exterior holonomic drive 801 and an interior holonomic drive 802 may coordinate on opposite sides of a sphere sidewall 812 in order to provide contact between multidirectional wheels 810 and the surfaces of the sidewall 812. In this manner, the drives 801, 802 may coordinate in order to produce movement of the drives 801, 802 with respect to the sphere 811 as described above. Moreover, the interior drive 802 may be provided with a beam 830 extending away from the drive 802. At an opposing end of the beam 830 may be a counterweight 840. In this regard, the counterweight 840 may assist in stabilizing the system 800.

That is, the counterweight 840 may further dampen or prevent rotation (Rs) of the sphere by imparting a righting moment on the system such that the counterweight 840 is influenced by gravity to remain below the interior drive 802 when it is positioned relative to and adjacent to the zenith (Z). As such, the counterweight 840 may assist the interior drive 802 and exterior drive 802 in balancing relative to the sphere 811 (e.g., relative to a zenith thereof). The counterweight 840 may be provided at different distances in order to change the height of the center gravity of the system 800 above a surface 828. As such, the lower of the center of gravity of the system 800, the more stable the platform may be. It may be advantageous to provide the center of gravity relatively low within the sphere 820 with respect to the surface 828 in order to provide a more stable platform. Alternatively, a less stable, more wobbly platform may be provided with a higher counterweight such that the visual effect of balancing is heightened by way of allowing the sphere to wobble slightly.

Figure 9:
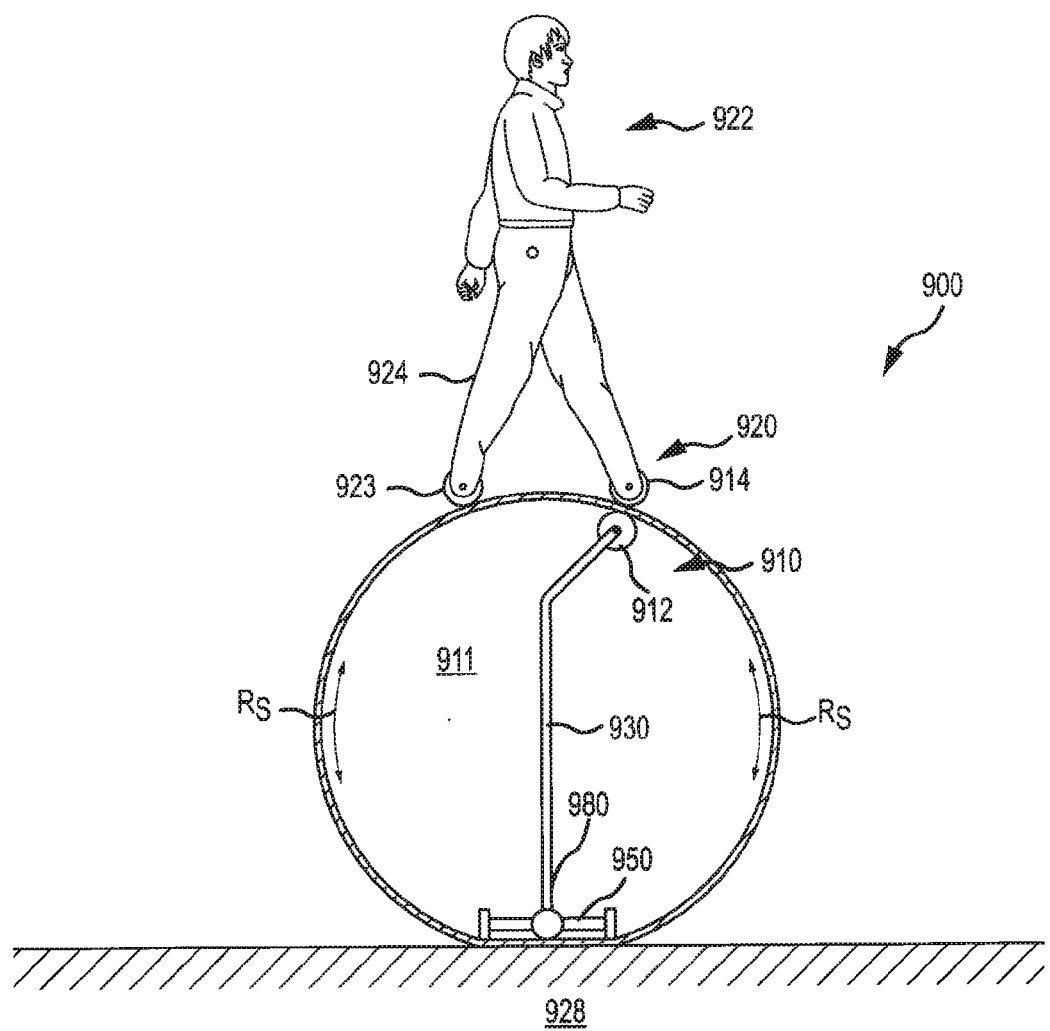
FIG. 9 is another embodiment of a holonomic drive system.

With reference to FIG. 9, an alternative embodiment of a holonomic drive system 900 is shown. The system 900 may include a sphere 911. Within the sphere 911 may be disposed a locomotive driver 950. The locomotive driver 950 may be resting on a surface 928 such that a portion of the sidewall of the sphere 911 rests between the locomotive drive 950 and the surface 928. A beam 930 may be operatively attached to the locomotive drive 950 and generally extend away from the surface 928.

On an end of the beam 930 may be an interior structure 910. The interior structure 910 may contact an interior portion of the sphere and allow movement of the sphere 911 with respect to the interior structure 910. The interior structure 910 may be a magnetic structure interacting through the sphere side wall with an exterior structure 920. The exterior structure 920 may be urged against an exterior portion of the sphere 911 by way of magnetic interaction with the interior structure 910. In this regard, the interior structure 910 and the exterior structure 920 may include mechanisms or structures that allow low friction interaction between the interior structure 910 and the sphere 911 as well as between the exterior structure 920 and the sphere 911, while facilitating continued contact between the interior portion and the interior structure 910 and the exterior portion and exterior structure 920. In this regard, the interior structure 910 or the exterior structure 920 may comprise rollers, gimbaled rollers, castored rollers, ball bearing rollers or any other appropriate mechanism or structure that allows for constant contact with the surface of the sphere while allowing for low friction movement of the sphere with respect to the respective structure.

The interior structure 910 may comprise a magnetic roller 912 contacting an interior portion of the sphere 911. The magnetic roller 912 may interact with a magnetic roller 914 of the exterior support 920. The exterior support 920 may at least partially comprise an animatronic character, puppet, prop, operator platform or other object. As depicted, the object 922 may include a trailing link 924 and follow roller 923 that may allow for stable movement of the object 922 on the exterior portion of the sphere 911.

In this regard, as the locomotive drive 950 translates with respect to the surface 928, the sphere 911 may rotate (Rs). Accordingly, the sphere 911 may also rotate (Rs) between the interior structure 910 and the exterior structure 920. In this regard, the magnetic roller 914 and the magnetic roller 912 may also rotate along with the sphere such that as the locomotive drive 950 moves the surface 928, the exterior structure 920 may remain at a relative position with respect to the sphere such that the sphere 911 rotates beneath the exterior structure 920. In this regard, it may appear as though the object 922 is riding or balancing atop the sphere 911 as it rotates below the object 922.

As the direction of the locomotive driver 950 changes, the change in direction may be facilitated such that a change in the rotation (Rs) of the sphere 911 is permitted by the interaction between the interior structure 910 and the exterior structure 920. That is, as the sphere 911 translates in any direction along the surface 928, the interior and exterior structure may coordinate such that the object 922 atop the sphere 911 appears to follow the movement of the sphere 911.

Figure 10:
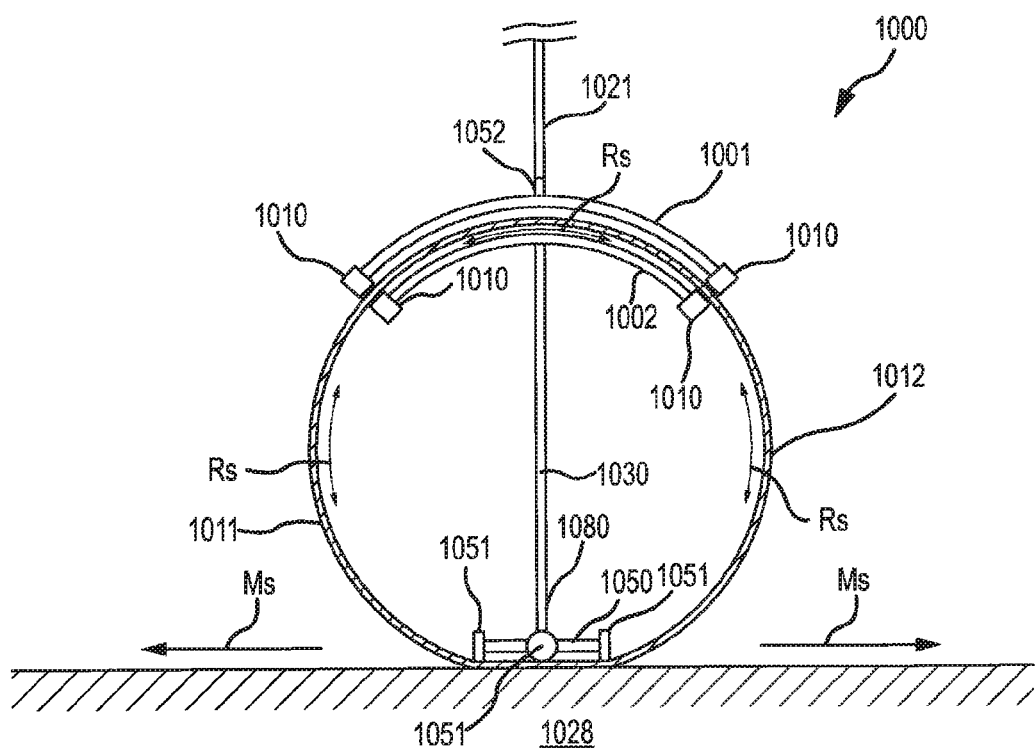
FIG. 10 is yet another embodiment of a holonomic drive system.

FIG. 10 depicts yet another alternative embodiment of a holonomic drive system 1000. The system 1000 may include an exterior drive 1001 and an interior holonomic drive 1002 similar to those described with referenced to FIG. 6. In this regard, the exterior drive 1001 may magnetically interact with the interior drive 1002 to maintain a relative position with each other on opposite sides of a sphere sidewall 1012. Additionally, the interior drive 1002 may have extending from it a support beam 1030. On the opposite end of the support beam 1030 from the interior drive 1002 may be a locomotive driver 1050. The locomotive driver 1050 may rest on and be supported by the surface 1028. In this regard, the locomotive driver 1050, along with the support beam 1030, may support the interior drive 1002. As such, the interior drive 1002, support beam 1030, and locomotive driver 1050 may be encapsulated by the sphere 1011. Notably, the sphere 1011 of the system 1000 may not provide support for the interior drive 1002 or the exterior drive 1001. As such, control of the drives 1001, 1002 in order to achieve balancing of the drives may not be needed in that the drives may both be supported by the support beam 1030 and the locomotive driver 1050.

The locomotive driver 1050 may move along the surface 1028 such that the sphere 1011 rolls beneath the locomotive driver 1050. The locomotive driver 1050 may in turn provide produce rotation (Rs) of the sphere 1011 resulting in movement (Ms) along the surface 1028 in a desired or predefined path. The locomotive driver 1050 may comprise any known drive in the art such as one employing tracks or wheels to move (Ms) the sphere 1011 along the surface 1028. Alternatively, the locomotive driver 1050 may also be holonomic (i.e., the drive 1050 may employ multidirectional wheels 1051) and it may have a design similar to the drives 200, 300, or 400 (referenced in FIG. 2, FIG. 3 and FIG. 4, respectively). In this regard, the locomotive driver 1050 may move in a holonomic fashion any direction along the XY plane corresponding to the surface 1028.

As mentioned, the embodiment of FIG. 10 may not include active balancing because the interior drive 1002 may be supported by the locomotive drive 1050 and support beam 1030. In this regard, the interior drive 1001 and exterior drive 1002 may not move with respect to the sphere 1011 to produce rotation (Rs) of the sphere 1011. Because the locomotive drive 1050 may produce motion (Ms) of the sphere 1011 along the surface, the sidewall 1012 of the sphere 1011 may also be rotated (Rs) by the locomotive drive 1050 such that the sphere 1011 may roll along the surface 1028 under the locomotive driver 1050. It will be appreciated that as the sphere 1011 rotates (Rs) under the locomotive driver 1050, the sphere 1011 also will rotate at the interface between the interior drive 1002 and the exterior drive 1001. In order to facilitate the rotation (Rs) the sphere 1011 between the interior drive 1002 and exterior drive 1001, the drives 1001, 1002 may be controlled such that the multidirectional wheels 1010 of the drives 1001, 1002 may coordinate with the movement of the locomotive drive 1050 in order to facilitate passage of the sphere 1011 between the drives 1001, 1002. This allows the sphere 1011 to roll along the surface 1028 and the exterior drive 1001 to maintain a relative position of the sphere (e.g. at a zenith of the sphere) without necessitating slots or other openings in the sphere 1011 to accommodate supports for the exterior drive 1001.

In any embodiment, the holonomic drive system of the present invention may be used to support an object. In this regard, the object (such as a character, operator, puppet, prop, or other appropriate entertaining object) may be positioned such that it appears the object is balancing on or riding on the sphere. The movement of the object and sphere may be accomplished by a controller or by way of outside control in communication with the controller. As such, an effect may be produced such that it appears the object is controlling or riding the sphere. Alternatively, a mast may be employed such that the sphere and mast may be ridden much the way a unicycle is ridden. In reality, the object may be supported by way of the coordinating internal and external drives and magnetic engagement therebetween along with a support beam and a locomotive drive.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such or other embodiments and with various modifications required by the particular application (s) or use(s) of the present invention. It is intended that the appended claims be construed to include alternative embodiments to the extent permitted by the prior art.

What is claimed is:

1. A magnetic holonomic drive system, comprising:
   a substantially spherical body having a surface portion;
   a holonomic drive having at least one multidirectional wheel contacting said surface portion of said substantially spherical body; and
   a holding magnet assembly on said holonomic drive and operative to urge said at least one multidirectional wheel against said surface portion of said substantially spherical body, wherein said substantially spherical body is controlled in response to rotation of said at least one multidirectional wheel.

2. The magnetic holonomic drive system of claim 1, further comprising:
   a control system responsive to one or more sensors and operable to control rotation of said at least one multidirectional wheel to position said holonomic drive in a relative position with respect to said substantially spherical body to control rotation of said substantially spherical body.

3. The magnetic holonomic drive system of claim 2, further comprising:
   a mast operatively connected to the holonomic drive and generally extending away from said substantially spherical body;
   wherein said control system is operative to monitor an orientation of said mast and control said at least one multidirectional wheel in order to maintain said mast in a substantially vertical orientation.

4. The magnetic holonomic drive system of claim 3, wherein said mast supports an object.

5. The magnetic holonomic drive system of claim 4, wherein said object comprises at least one of an operator, an animatronic character, a puppet, and a prop.

6. The magnetic holonomic drive system of claim 2, wherein said control system comprises a processor in operative communication with an inertial measuring unit.

7. The magnetic holonomic drive system of claim 6, wherein said processor is operative to interpret an output of said inertial measuring unit to generate at least one control signal that is in turn communicated to a motor in engagement with said at least one multidirectional wheel.

8. The magnetic holonomic drive system of claim 1, wherein said substantially spherical body comprises a ferrous material and said holding magnet assembly magnetically interacts with said ferrous material to urge said at least one multidirectional wheel against said surface portion.

9. The magnetic holonomic drive system of claim 1, wherein said substantially spherical body comprises a non-ferrous material, and the magnetic holonomic drive system further comprises:
   a magnetic structure interacting with said holonomic drive to maintain said holonomic drive against said surface portion of said substantially spherical body.

10. The magnetic holonomic drive system of claim 9, wherein said magnetic structure comprises a second holonomic drive having at least a second multidirectional wheel contacting a second surface portion of said substantially spherical body, said second holonomic drive having a second holding magnet assembly and operative to urge said first holonomic drive and said second holonomic drive against said surface portion and said second surface portion of said substantially spherical body, wherein said substantially spherical body is controlled in response to rotation of said first multidirectional wheel and said second multidirectional wheel.

11. The magnetic holonomic drive system of claim 9, further comprising:
a counterweight attached to and extending away from said magnetic structure such that said counterweight is disposed entirely within an interior volume of said substantially spherical body.

12. The magnetic holonomic drive system of claim 1, wherein said holonomic drive covers an area less than about 10% of a total one of said surface portion.

13. A vehicle capable of holonomic motion over a surface, the vehicle comprising:
a substantially spherical body defining an interior volume and having a sidewall with an interior surface and an exterior surface;
a locomotive drive within said interior volume and supported on said surface and engageable with said interior surface to produce rotation of said substantially spherical body such that said substantially spherical body moves with respect to said surface;
a support beam attached to said locomotive drive and extending away from said locomotive drive;
an interior support operatively connected to an end portion of said support beam opposite said locomotive drive, said interior support contacting said interior surface and said interior support including a first magnetic holding portion; and
an exterior support contacting said exterior surface of the substantially spherical body and on an opposite side of said sidewall as said interior support, said exterior support having a second magnetic holding portion in magnetic interaction with said first magnetic holding portion to produce an urging force relative to said interior and exterior supports.

14. The vehicle of claim 13, wherein said interior support comprises a first holonomic drive.

15. The vehicle of claim 14, wherein said exterior support comprises a second holonomic drive.

16. The vehicle of claim 13, wherein said exterior support at least partially comprises at least one of an operator platform, an animatronic character, a puppet, and a prop.

17. A method for controlling a robotic system, the method comprising:
sensing a position of a holonomic drive in contact with a sphere;
determining a correction command necessary to affect a desired change in position of said holonomic drive;
generating a control signal comprising information about said correction command;
rotating at least one multidirectional wheel in contact with said sphere to affect movement of said holonomic drive with respect to said sphere corresponding to said correction command.

18. The method of claim 17, wherein said desired change in position corresponds to a desired movement of said sphere along a surface.

19. The method of claim 18, further comprising the step of:
positioning said drive with respect to said sphere to affect said desired movement of said sphere.

20. The method of claim 16, wherein said at least one multidirectional wheel is in contact with said sphere by way of magnetic interaction.

* * * * *